(12) United States Patent
Groves, Jr. et al.

(10) Patent No.: US 9,137,981 B1
(45) Date of Patent: Sep. 22, 2015

(54) FISHING ROD CADDY

(76) Inventors: Jack R. Groves, Jr., Winter Park, FL (US); Nadine M. Groves, Winter Park, FL (US)

( * ) Notice: Subject to any disclaimer, the term of this patent is extended or adjusted under 35 U.S.C. 154(b) by 0 days.

(21) Appl. No.: 13/564,340

(22) Filed: Aug. 1, 2012

(51) Int. Cl.
*A47F 7/00* (2006.01)
*A01K 97/08* (2006.01)
*A01K 97/10* (2006.01)
*A47B 81/00* (2006.01)

(52) U.S. Cl.
CPC .............. *A01K 97/08* (2013.01); *A01K 97/10* (2013.01); *A47B 81/005* (2013.01)

(58) Field of Classification Search
CPC ....... A01K 97/00; A01K 97/04; A01K 97/06; A01K 97/08; A01K 97/10; A01K 97/22; B25H 3/04; A63B 71/0036; A63B 71/0045; A47B 81/00; A47B 81/005
USPC ........ 211/70.8, 60.1, 62, 65, 69.5, 70.2, 70.4, 211/85.18, 85.21; 43/21.2, 25, 54.1; 206/315.11, 372; 224/922; 248/512
See application file for complete search history.

(56) References Cited

U.S. PATENT DOCUMENTS

| | | | | |
|---|---|---|---|---|
| 3,456,806 | A * | 7/1969 | Borston | 211/60.1 |
| 3,532,221 | A * | 10/1970 | Kaluhiokalani et al. | 211/70.6 |
| 4,014,128 | A | 3/1977 | Hrdlicka | |
| 4,281,768 | A * | 8/1981 | Sommers | 211/74 |
| 4,311,262 | A | 1/1982 | Morin | |
| 4,353,182 | A | 10/1982 | Junkas et al. | |
| 4,529,112 | A | 7/1985 | Miller | |
| D290,853 | S * | 7/1987 | Appel | D19/85 |
| 4,750,617 | A * | 6/1988 | Anderson et al. | 206/315.6 |
| 5,092,463 | A * | 3/1992 | Dees | 206/373 |
| 5,209,009 | A | 5/1993 | Fast | |
| 5,331,761 | A | 7/1994 | Kuthy | |
| D360,782 | S * | 8/1995 | Wright | D6/467 |
| 5,752,340 | A | 5/1998 | Fleener | |
| 6,178,896 | B1 * | 1/2001 | Houk et al. | 108/186 |
| 6,185,860 | B1 | 2/2001 | Thibodeaux | |
| 6,378,699 | B1 | 4/2002 | Churchill | |
| 6,530,487 | B1 * | 3/2003 | Berry | 211/70.6 |
| 6,702,111 | B2 * | 3/2004 | Ueno | 206/315.3 |
| 6,755,311 | B2 * | 6/2004 | Berry | 211/70.6 |
| 6,883,268 | B2 * | 4/2005 | Fraser | 43/54.1 |
| 7,013,596 | B1 | 3/2006 | Moore | |
| 7,063,218 | B2 * | 6/2006 | Pleiman et al. | 211/70.6 |
| 7,150,123 | B1 * | 12/2006 | Fox | 43/54.1 |
| D574,668 | S | 8/2008 | Kelly | |
| 7,594,353 | B2 * | 9/2009 | Lucky | 43/21.2 |
| 7,650,713 | B1 | 1/2010 | Peede | |
| 8,052,020 | B1 | 11/2011 | Wurtz | |
| 2006/0236589 | A1 | 10/2006 | Boyette et al. | |
| 2009/0071058 | A1 | 3/2009 | Chavez et al. | |

* cited by examiner

*Primary Examiner* — Korie H Chan
(74) *Attorney, Agent, or Firm* — Allen Dyer Doppelt Milbrath & Gilchrist

(57) ABSTRACT

A fishing rod cavity. A top is joined to a bottom by a plurality of columns. An upper end of each column is frictionally disposed within a top cavity; a lower end of each column is frictionally disposed within a bottom cavity. A column cavity sized to admit a fishing rod handle is disposed at an upper end of each column, to hold the fishing rod for rinsing after salt water use. Drains through the bottom allow rinse water to escape out of a cavity in the fishing rod caddy, and also reduce the fishing rod caddy's weight. Alternate embodiments provide slots sized to admit, store, and transport tackle box trays, and a cavity sized to admit a standard bucket. The fishing rod caddy is made of nylon, plastic, or synthetic material to reduce water absorption and help prevent mold growth on the fishing rod caddy.

5 Claims, 6 Drawing Sheets

FISHING ROD CADDY

BACKGROUND OF THE INVENTION

1. Field of the Invention

This invention relates to fishing equipment, and in particular to a fishing rod caddy.

2. Background of the Invention

Rod fishing is a popular sport pursued by millions each year. After use in salt water, fishing rods must be rinsed in order to prevent corrosion by the salt. An on-going problem is the absence of an effective way to hold fishing rods in order to rinse them off with a hose, and subsequently to hold them while they dry. In addition, it would be desirable to provide an apparatus to store and transport the fishing rods between uses.

Other considerations in the design of a rinse-off fishing rod holder are light weight (to make it easily transportable), and a material which is resistant to mold, such as nylon, plastic, or synthetic. Wood tends to hold water, which lengthens the fishing rod drying process. Built-in handles would also be useful to facilitate transportation.

Finally, slots inside the fishing rod caddy sized to admit tackle box trays, and space inside the caddy to accommodate a throw net bucket, would increase the utility of the fishing rod caddy.

Existing Designs

A number of designs have been proposed for boxes which are capable of supporting fishing rods. One approach has been to affix rod holder(s) to an enclosed box which is also used for other purposes. Exemplary among these are U.S. Pat. Nos. 8,052,020, 7,650,713, and 5,331,761 granted to Wurtz, Peede and Kuthy respectively. While these taught fishing rod supports, the fact that the supports depended from containers used for other purposes rendered them inappropriate for use as fishing rod holders while rinsing of fishing rods with fresh water, because water and salt runoff from the fishing rods could enter and foul the interior of the containers supporting the rods. In addition, no drainage holes were taught allowing the runoff to emerge from the containers, nor receptacles for tackle box trays or a throw net bucket.

Churchill was granted U.S. Pat. No. 6,378,699 for an ice fishing implement caddy, which disclosed supports for jigging rods. This design also disclosed a closed box base, which if used to spray down fishing rods would fill with spray water and salt runoff from the rods, fouling and flooding the contents of the box in the process. In addition, no drainage holes were taught allowing the runoff to emerge from the containers, nor receptacles for tackle box trays or a throw net bucket.

Thus, it would be desirable to provide a fishing rod caddy which is appropriate to hold fishing rods while rinsing off the fishing rods after use, which incorporates drain holes for water runoff, which is constructed of material which is lightweight and does not absorb water, which has built-in handles, a bucket receptacle, and slots which admit tackle box trays.

SUMMARY OF THE INVENTION

Accordingly, it is an object of the present invention to provide a fishing rod caddy which holds fishing rods in place for rinsing off after use. Design features allowing this object to be accomplished include a plurality of columns removably attached at upper ends to a caddy top and at lower ends to a caddy bottom, each column having a column receptacle sized to admit a fishing rod handle, and the bottom having drain holes to allow rinse water to escape from the fishing rod caddy. Advantages associated with the accomplishment of this object include ease of rinsing off fishing rods, and avoidance of the problem of rinse water accumulating within the fishing rod caddy.

It is another object of the present invention to provide a fishing rod caddy which is easily transportable. Design features allowing this object to be accomplished include a fishing caddy manufactured of light-weight material, a top and bottom joined by columns, lightening holes/drains in the bottom, and built-in caddy handles. Benefits associated with the accomplishment of this object include ease of transportation and storage of the fishing rod caddy.

It is still another object of this invention to provide a fishing rod caddy which does not absorb or retain water. Design features enabling the accomplishment of this object include a fishing rod caddy made of non-absorptive material. Advantages associated with the realization of this object include quick caddy drying after fishing rod rinsing, and avoidance of mold growing on the fishing rod caddy.

It is another object of the present invention to provide a fishing rod caddy which accommodates storage and transportation of tackle box trays. Design features allowing this object to be accomplished include fins extending into the top mouth and caddy cavity, which define slots sized to slidably admit a tackle box tray. A benefit associated with the accomplishment of this object is increased flexibility of use of the fishing rod caddy.

It is still another object of the present invention to provide a fishing rod caddy which accommodates storage and transportation of a bucket. Design features allowing this object to be accomplished include a top mouth and caddy cavity which are sized to admit a bucket. A benefit associated with the accomplishment of this object is increased flexibility of use of the fishing rod caddy.

It is still another object of the present invention to provide a fishing rod caddy which is capable of breaking down into a compact size for shipping and storage. Design features allowing this object to be accomplished include a plurality of columns removably attached at upper ends to a caddy top and at lower ends to a caddy bottom. Benefits associated with the accomplishment of this object include reduced shipping size, and consequent reduced shipping cost.

It is yet another object of this invention to provide a fishing rod caddy which is inexpensive to manufacture. Design features allowing this object to be achieved include the use of components made of readily available materials. Benefits associated with reaching this objective include reduced cost, and hence increased availability.

BRIEF DESCRIPTION OF THE DRAWINGS

The invention, together with the other objects, features, aspects and advantages thereof will be more clearly understood from the following in conjunction with the accompanying drawings.

Six sheets of drawings are provided. Sheet one contains FIG. 1. Sheet two contains FIG. 2. Sheet three contains FIG. 3. Sheet four contains FIG. 4. Sheet five contains FIG. 5. Sheet six contains FIG. 6.

DETAILED DESCRIPTION OF THE PREFERRED EMBODIMENT

Figure 1:
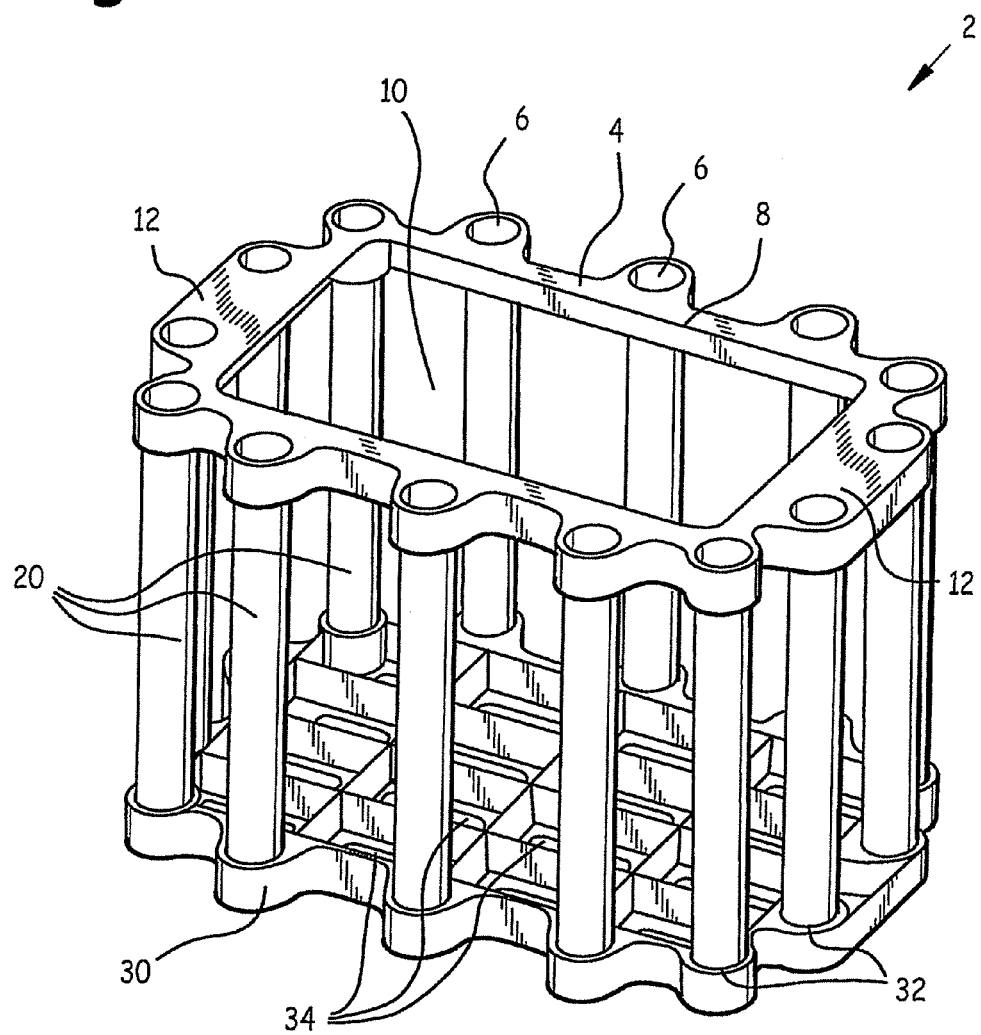
FIG. 1 is a front left quarter isometric view of a fishing rod caddy.

Referring now to FIG. 1, a front left quarter isometric view of fishing rod caddy 2, fishing rod caddy 2 is made up of three principal components: substantially planar top 6, elongate columns 20, and substantially planar bottom 30. Top 4 comprises a plurality of top receptacles 6 disposed around its perimeter, each sized to frictionally admit a corresponding column 20 upper end. Bottom 30 comprises a bottom receptacle 32 corresponding to, and disposed directly below, each top receptacle 6. Each bottom receptacle 32 is sized to frictionally admit a corresponding column 20 lower end. Bottom receptacles 32 are disposed around the perimeter of bottom 30.

Figure 2:
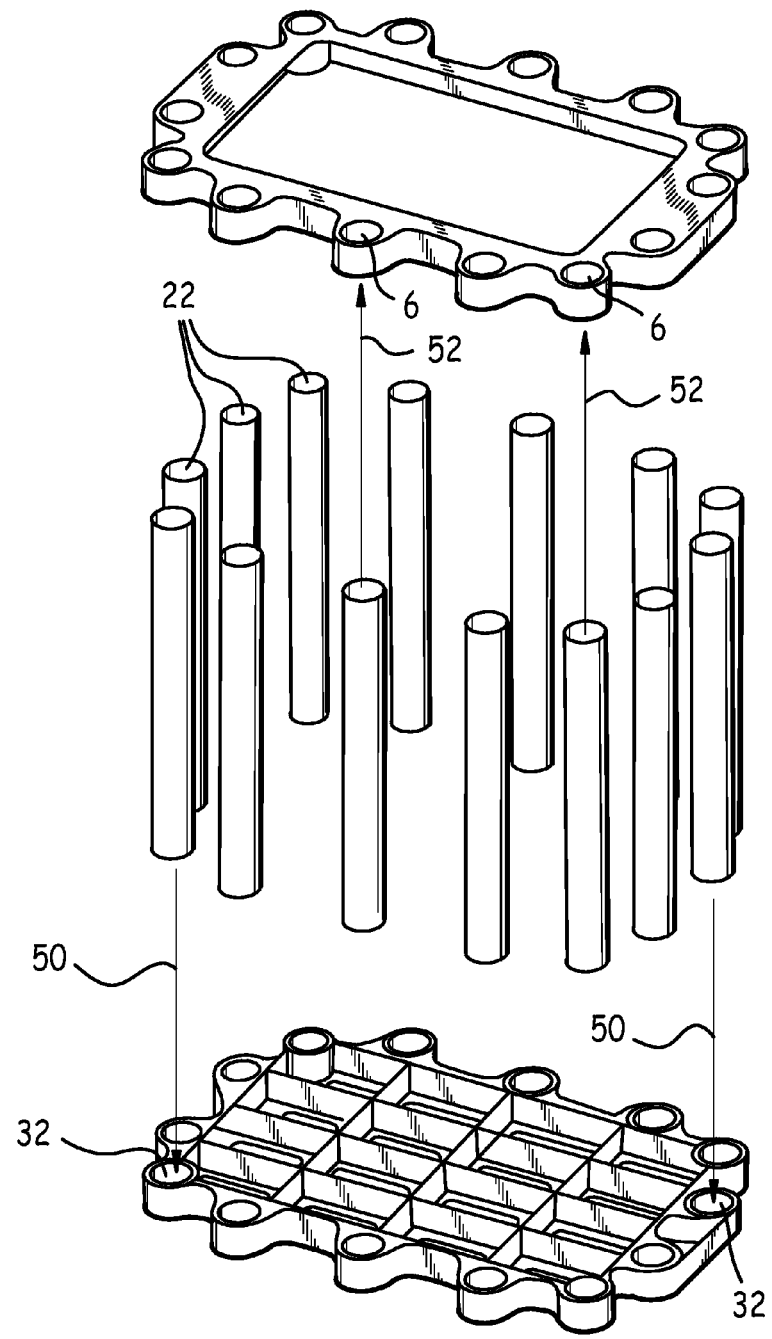
FIG. 2 is a front left quarter exploded isometric view of a fishing rod caddy.
Figure 3:
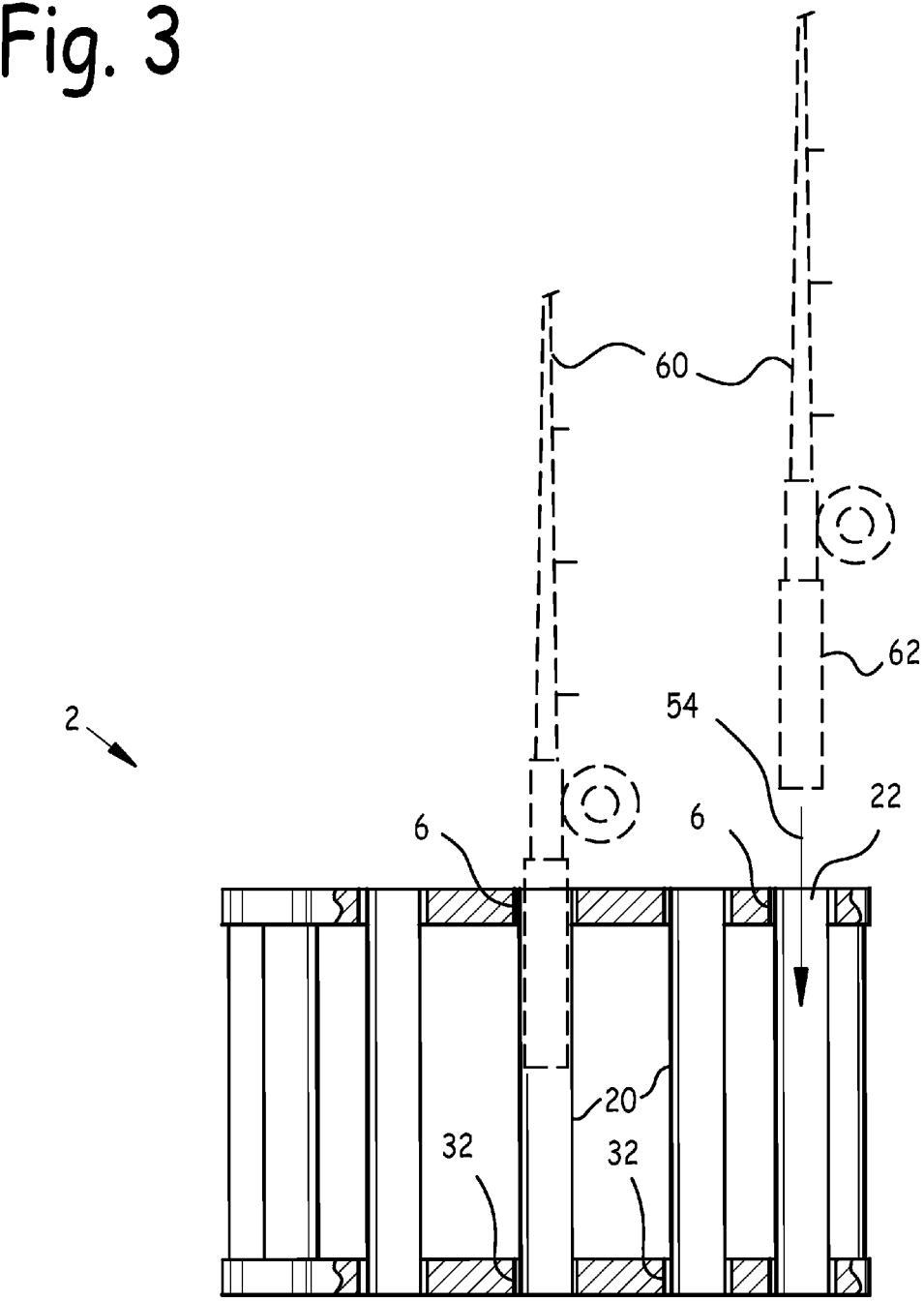
FIG. 3 is a front cross-sectional view of a fishing rod caddy.
Figure 4:
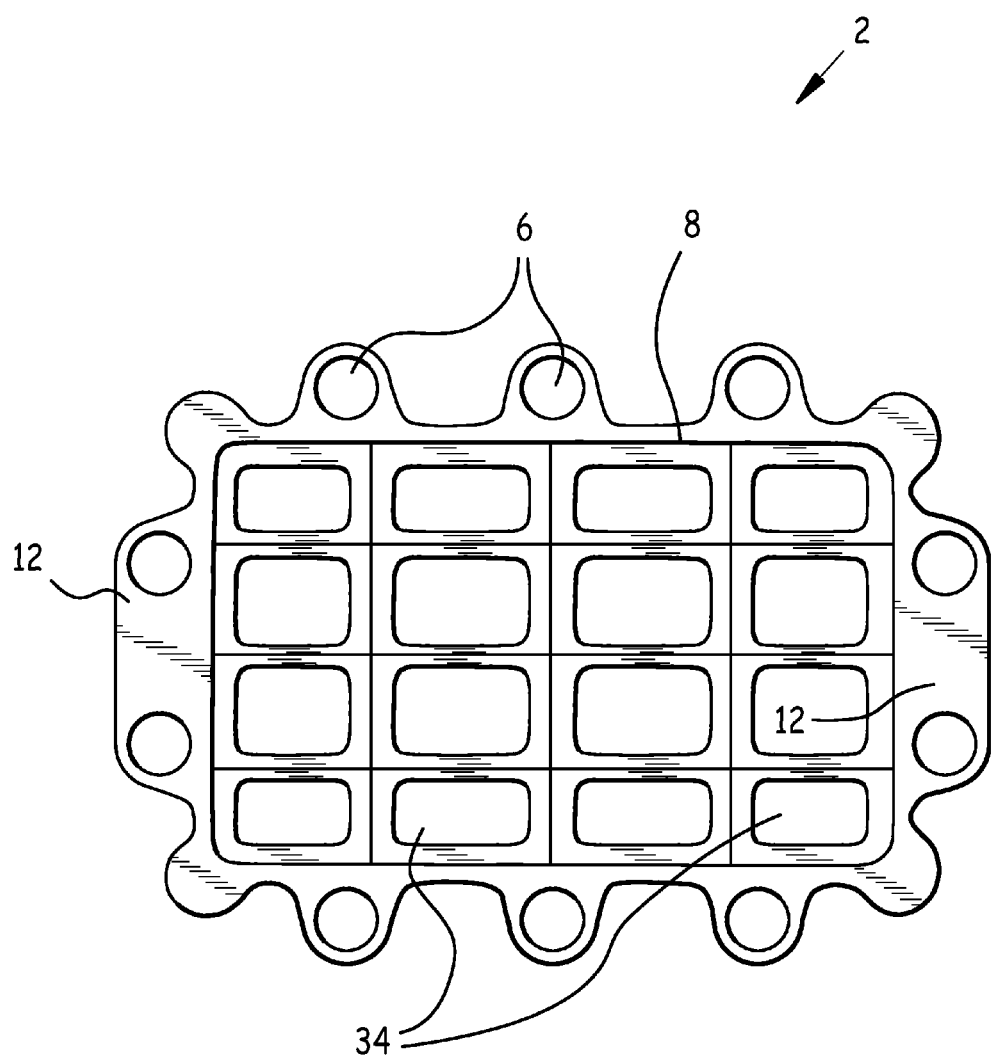
FIG. 4 is a top view of a fishing rod caddy.

FIG. 2 is a front left quarter exploded isometric view of fishing rod caddy 2. FIG. 3 is a front cross-sectional view of fishing rod caddy 2. FIG. 3 is a front cross-sectional view of a fishing rod caddy 2. FIG. 4 is a top view of fishing rod caddy 2. Referring now to these figures, fishing caddy 2 is assembled by frictionally inserting a lower end of each column 20 into a corresponding bottom receptacle 32 as indicated by arrows 50 in FIG. 2, and an upper end of each column 20 into a corresponding top receptacle 6 as indicated by arrows 52 in FIG. 2. As may be observed in FIG. 3, the upper end of each column 20 resides in a corresponding top receptacle 6, and the lower end of each column 20 resides in a corresponding bottom receptacle 32. The resulting colonnade encloses and defines cavity 10.

Top 4 comprises top mouth 8. Cavity 10 communicates with an exterior of fishing rod caddy 2 through mouth 8. Top 4 and bottom 30 are substantially rectangular when viewed in plan view, as illustrated in FIG. 4. Top 4 further comprises a caddy handle 12 on two opposing sides of top 4 to facilitate carrying fishing rod caddy 2.

Bottom 30 comprises a plurality of bottom drains 34, which are apertures extending through bottom 30, top to bottom. Bottom drains 34 serve to allow rinse water to escape fishing rod caddy 2, and also serve as lightening cutouts to reduce the weight of fishing rod caddy 2.

As may be observed in FIGS. 2 and 3, a column receptacle 22 is disposed at an upper end of each column 20. Each column receptacle 22 is sized to admit fishing rod handle 62 of fishing rod 60. In use, after fishing rod caddy 2 has been assemble as explained above, fishing rod caddy 2 may be used to hold fishing rods 60 for rinsing, storage, and transportation, by inserting a fishing rod handles 62 into corresponding column apertures 22 as desired, as indicated by arrow 54 in FIG. 3.

Figure 5:
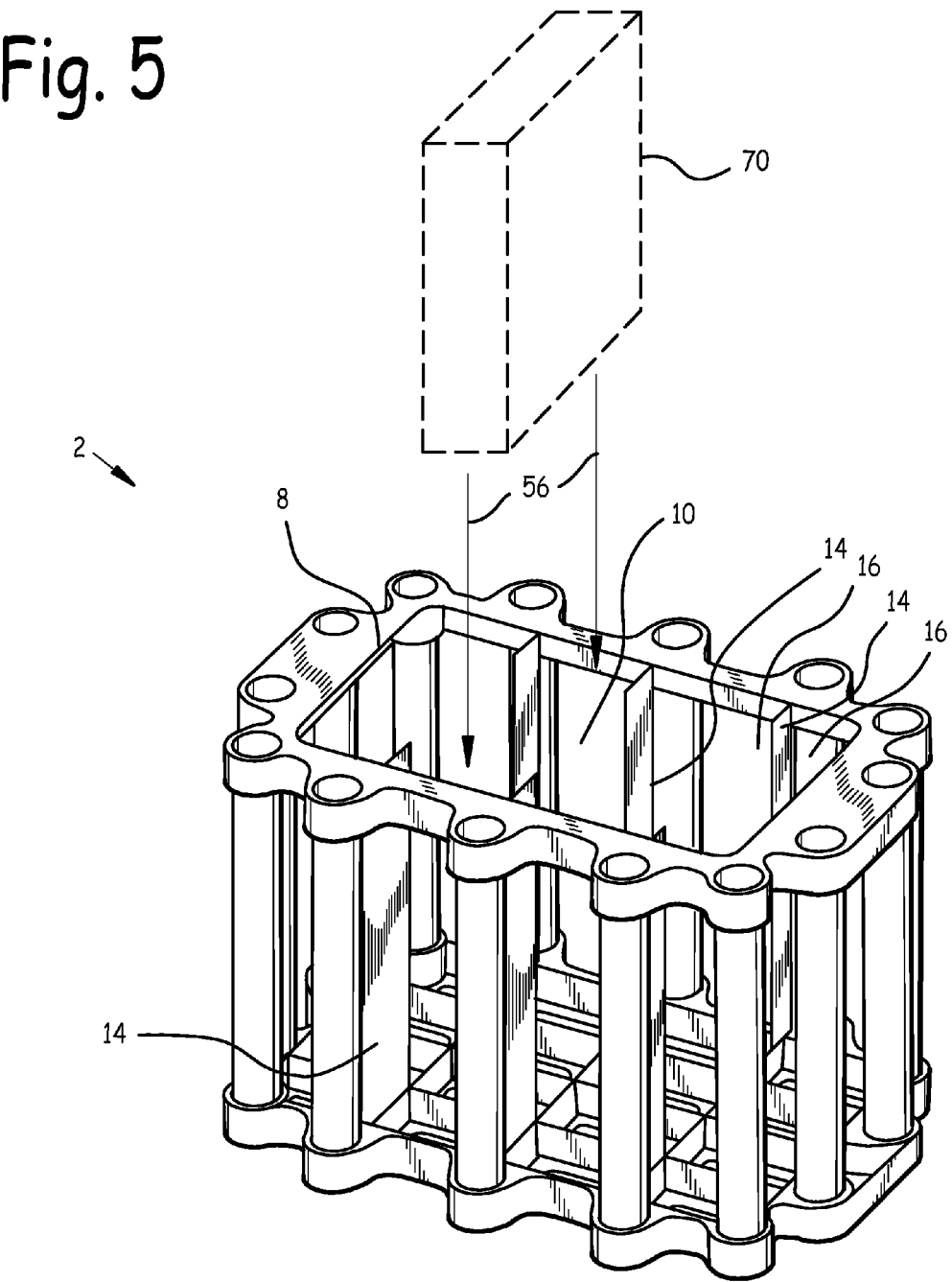
FIG. 5 is a front left isometric view of a fishing rod caddy having slots sized to admit tackle box trays.

FIG. 5 illustrates an alternate embodiment fishing rod caddy 2 having a plurality of fins 14 extending into cavity 10. Fins 14 are disposed along opposing sides of cavity 10; each fin 14 is associated with a corresponding fin 14 disposed directly opposite on an opposing side of cavity 10. The space between adjacent pairs of corresponding fins 14, and the space between a corresponding pair of fins 14 and an adjacent cavity 10 side, subdivide cavity 10 into slots 16.

Each slot 16 is sized to slidably admit a tackle box tray 70, as indicated by arrow 56 in FIG. 5. In use, a tackle box tray 70 may be inserted into a slot 16 for storage and or transportation. When it is desired to access a tackle box tray 70 resting in a slot 16, such tackle box tray 70 may be easily slid out of its slot 16 for access, and then replaced there after use.

Although FIG. 5 depicts pairs of opposing fins 14 positioned to define slots 16 sized to admit tackle boxes 70, it is intended to fall within the scope of this disclosure that fins 14 extend completely across cavity 8, thereby defining slots 16.

Figure 6:
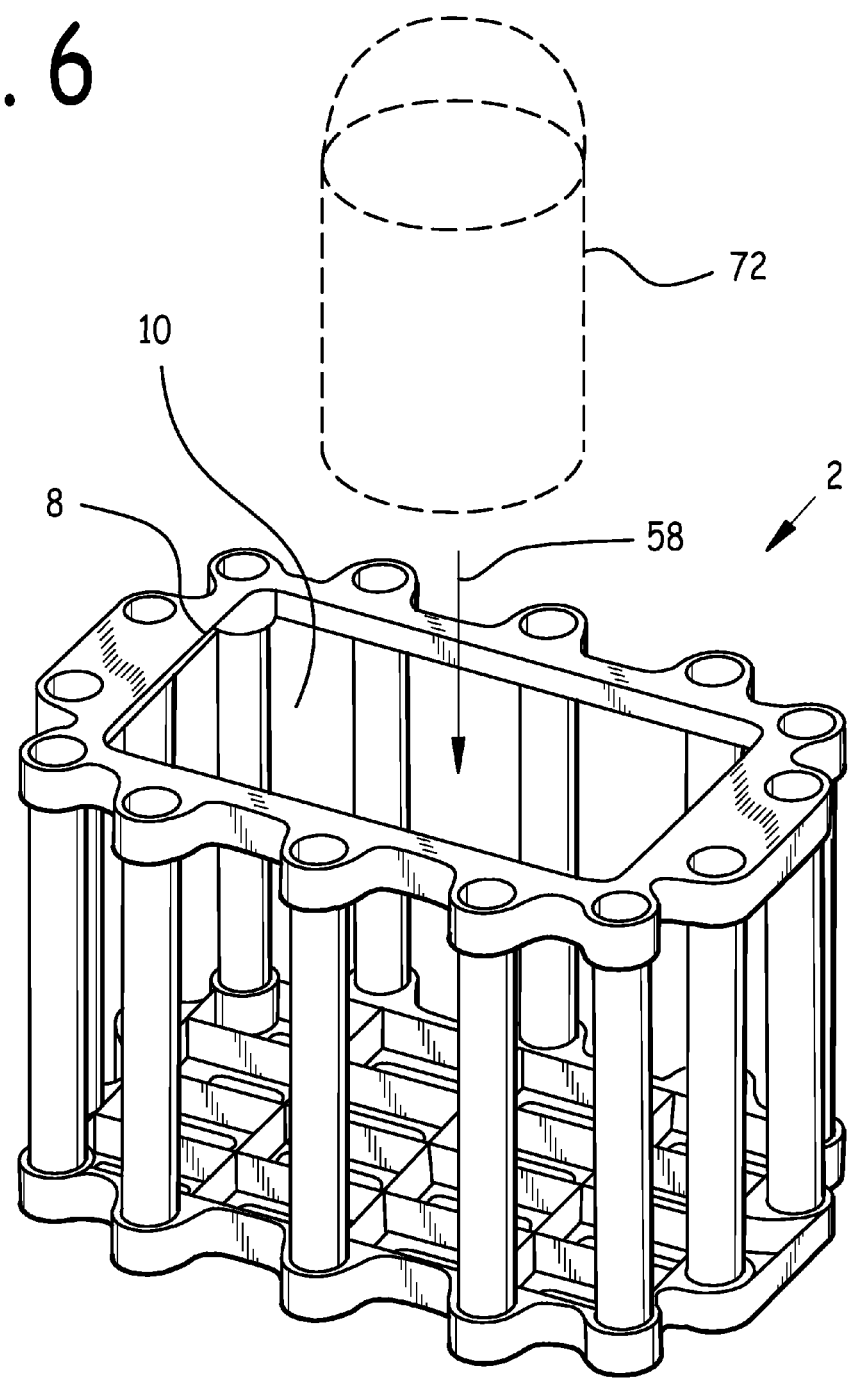
FIG. 6 is a front left isometric view of a fishing rod caddy, with a bucket about to be inserted into its cavity.

FIG. 6 is a front left isometric view of fishing rod caddy 2, with a bucket 72 about to be inserted through mouth 8 into cavity 10 as indicated by arrow 58. As may be observed in this figure, mouth 8 and cavity 10 are sized to admit a standard sized bucket 72, which in turn may be conveniently used to hold casting nets, bait fish, etc.

In the preferred embodiment, top 4, columns 20, and bottom 30 were made of nylon, plastic, synthetic, metal, or other non-water absorptive material. Such material choice helps prevents mold from forming on fishing rod caddy 2, and also renders fishing rod caddy 2 light-weight for convenience of use and carrying.

While a preferred embodiment of the invention has been illustrated herein, it is to be understood that changes and variations may be made by those skilled in the art without departing from the spirit of the appending claims.

DRAWING ITEM INDEX 2 fishing rod caddy
4 top
6 top receptacle
8 top mouth
10 cavity
12 caddy handle
14 fin
16 slot
20 column
22 column receptacle
30 bottom
32 bottom receptacle
34 bottom drain
50 arrow
52 arrow
54 arrow
56 arrow
58 arrow
60 fishing rod
62 fishing rod handle
70 tackle box tray
72 bucket

We claim:

1. A fishing rod caddy comprising a substantially planar top with a top mouth therein, a plurality of elongate columns encircling and enclosing a cavity, said cavity communicating with an exterior of said fishing rod caddy through said top mouth, and a substantially planar bottom, a plurality of top receptacles disposed around a perimeter of said top, each said top receptacle being sized to admit an upper end of one said column, and a plurality of bottom receptacles disposed around a perimeter of said bottom, each said bottom receptacle being sized to admit a lower end of one said column, wherein said mouth and said cavity are sized to admit a standard sized bucket;

further comprising a column cavity at an upper end of each said column, each said column cavity being sized to admit the handle of a fishing rod;

further comprising a plurality of drains in said bottom, each said drain extending through said bottom, whereby water in said cavity may drain out, and whereby a weight of said fishing rod caddy may be lessened;

further comprising opposed pairs of fins disposed on opposing sides of said cavity, each said pair of opposing fins in combination with another pair of opposing fins or with an adjacent edge of said top mouth defining a slot, each said slot being sized to slidably admit a tackle box tray; and wherein a plan view shape of said top is substantially rectangular, and wherein a plan view shape of said bottom is substantially rectangular, said top comprising a handle disposed on each of two opposed top sides.

2. A fishing rod caddy combination comprising:
a fishing rod having a handle; and
a fishing rod caddy having a substantially planar top, a plurality of elongate columns, and a substantially planar bottom, a plurality of top receptacles disposed around a perimeter of said top, each said top receptacle being sized to frictionally admit an upper end of one said column, a plurality of bottom receptacles disposed around a perimeter of said bottom, each said bottom receptacle being sized to frictionally admit a lower end of one said column, a top mouth in said top, said columns encircling and enclosing a cavity, said cavity communicating with an exterior, and further comprising a column cavity at an upper edge of each said column, each said column cavity being sized to admit the handle of the fishing rod, the handle of the fishing rod being disposed within one of said column cavities.

3. The fishing rod caddy combination of claim 2, further comprising said tackle box;
wherein said fishing rod caddy further includes opposed pairs of said fins disposed on opposing sides of said cavity, each said pair of opposing fins in combination with another pair of opposing fins or with a side of said cavity adjacent said fins defining the slot, each said slot being sized to slidably admit said tackle box tray, said tackle box tray being disposed within one said slot.

4. The fishing rod caddy of claim 2, further comprising a bucket;
wherein said mouth and said cavity are sized to admit said bucket, said bucket being disposed within said cavity of said fishing rod caddy through said mouth.

5. A fishing rod caddy combination comprising:
a bucket; and
a fishing rod caddy including:
a bottom having a plurality of bottom receptacles spaced about a perimeter thereof, a base extending across said perimeter and supporting the bucket thereon, and a plurality of drain apertures extending through said base;
a plurality of columns extending upwardly from said bottom receptacles, each of said columns having a column receptacle formed through an upper end thereof and sized to receive a fishing rod handle;
a top having plurality of top receptacles spaced about perimeter thereof, said top receptacles receiving said upper end of said columns while leaving said column receptacles open for receiving said fishing rod handle;
a mouth formed through said top between said top receptacles, said mouth sized to admit said bucket; and
a cavity having a lower portion defined by said base, an upper portion defined by said top, and a lateral perimeter defined by said columns, at least some of said columns being positioned between opposed corners of said perimeter so as to form a colonnade enclosing said cavity.

* * * * *